(12) United States Patent
Takekawa et al.

(10) Patent No.: US 6,498,706 B1
(45) Date of Patent: Dec. 24, 2002

(54) DUAL DRIVING UNIT FOR A MAGNETIC HEAD CARRIAGE ASSEMBLY AND MAGNETIC DISK DRIVE

(75) Inventors: Hiroshi Takekawa, Kawasaki (JP); Shinji Koganezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/501,646

(22) Filed: Feb. 10, 2000

(30) Foreign Application Priority Data

Mar. 15, 1999 (JP) .......................................... 11-068999

(51) Int. Cl.$^7$ ................................................. G11B 5/56
(52) U.S. Cl. ................................. 360/294.5; 360/264.5
(58) Field of Search ............................. 360/294, 294.1, 360/294.2, 294.3, 294.4, 294.5, 294.6, 294.7, 264.4, 264.5

(56) References Cited

U.S. PATENT DOCUMENTS

| | | | | |
|---|---|---|---|---|
| 4,145,725 A | * | 3/1979 | Wallis ....................... | 360/264.3 |
| 4,875,122 A | * | 10/1989 | Daniels et al. ............. | 360/294.1 |
| 5,031,055 A | * | 7/1991 | Yanagisawa ............. | 360/294.7 |
| 5,796,558 A | * | 8/1998 | Hanrahan et al. ........ | 360/294.6 |
| 5,847,903 A | * | 12/1998 | Ogawa et al. ........... | 360/294.8 |
| 6,025,975 A | * | 2/2000 | Fard ........................ | 360/294.4 |

FOREIGN PATENT DOCUMENTS

| | | |
|---|---|---|
| JP | 4134681 | 5/1992 |
| JP | 6020415 | 1/1994 |
| JP | 9161425 | 6/1997 |
| JP | 411353611 A | * 11/1999 |

* cited by examiner

Primary Examiner—A. J. Heinz
(74) Attorney, Agent, or Firm—Greer, Burns & Crain, Ltd.

(57) ABSTRACT

A head carriage assembly is provided. A secondary magnetic driving device situated on a side of a hub portion is of a movable coil type, and includes a movable coil and a magnetic circuit body. The movable coil has an axial line perpendicular to a surface including a rotational center shaft, and is secured to a side surface of the hub portion. The magnetic circuit body 85 is made up of a U-shaped yoke and a permanent magnet. A yoke side surface penetrates through an opening of the movable coil, with a little room being left in the opening. A long side of the movable coil is engaged with the magnetic gap, also with a little room being left. The yoke side surface serves as the iron core of the movable coil. In a tracking operation, the secondary magnetic driving unit is actuated. A point in the movable coil where force is generated is distant from the rotational center shaft, and the torque constant of the point is large.

9 Claims, 16 Drawing Sheets

DUAL DRIVING UNIT FOR A MAGNETIC HEAD CARRIAGE ASSEMBLY AND MAGNETIC DISK DRIVE

BACKGROUND OF THE INVENTION

1. Field of the Invention

The present invention generally relates to magnetic disk drives and magnetic head carriage assemblies, and more particularly, to a magnetic disk drive and a magnetic head carriage assembly suitable for high-density recording.

2. Description of the Related Art

At present, high-density recording is being introduced to 3.5-inch and other types of magnetic disk drives. In order to increase the recording density, however, it is necessary to increase the number of tracks per unit length of magnetic disk, or TPI, and increasing TPI decreases the width of each track and requires a consequent enhancement in the accuracy with which the magnetic head is positioned. Increasing the TPI to 25,000, for example, reduces the track pitch to 1 μm, requiring the positional accuracy of the magnetic head to be within 0.1 μm. Also, there is a trend toward smaller magnetic disk drives and less power consumption. Therefore, it is necessary to develop a magnetic head carriage assembly which satisfies such demands.

To improve the positioning accuracy of the magnetic head, the loop gain of a positioning servo system should be increased, and the crossover frequency of the open loop should be increased. The maximum loop gain of the positioning servo system is determined by the natural frequency of the head carriage which is rotationally supported on a shaft. Therefore, in a conventional magnetic disk drive, the head carriage has a high rigidity so as to increase the natural frequency of the head carriage, and to increase the loop gain of the positioning servo system as much as possible.

However, even if the head carriage has a high rigidity, a translational force acts on the bearing in such a direction that influences the positioning of the magnetic head. In such a case, it is difficult to obtain the positioning accuracy of the magnetic head of 0.1 μm or less.

SUMMARY OF THE INVENTION

A general object of the present invention is to provide a head carriage assembly in which the above disadvantages are eliminated.

The above object of the present invention is achieved by a head carriage assembly which comprises: a head carriage which has a hub portion rotatably supported about a rotational center shaft on a base, and moves a head in a radial direction of a rotating disk; a first driving unit which generates a force to rotate the head carriage; and a second driving unit which generates a force to rotate the head carriage in a direction perpendicular to a line connecting a rotational center of the head carriage and the head. The second driving unit comprises: a coil secured outside the hub portion of the head carriage, and has an axial line vertical to a surface which includes the rotational center shaft on the base; and a magnetic circuit body which is made up of a yoke and a permanent magnet, with a magnetic gap being formed between the yoke and the permanent magnet, and engages the coil to be secured to the base. A part of the coil moves within the magnetic gap.

Since the axial line of the coil is perpendicular to the surface including the rotational center shaft, the space for the coil in the circumferential direction of a circle around the rotational center shaft does not have to be large. When the head carriage is rotated so that the head moves in the radial direction of the disk, the coil does not require a large space for moving in the circumferential direction. Accordingly, the magnetic circuit body can be small in the circumferential direction. Here, it is possible to place the coil outside the hub portion of the head carriage in the limited space. The coil can be situated at a longer distance from the rotational center shaft compared with the prior art, and the torque constant of the driving unit can be larger than in the prior art. Thus, the magnetic circuit body can be made smaller, and power consumption can be reduced compared with the prior art.

The object of the present invention is also achieved by a disk drive provided with the above head carriage assembly.

The above and other objects and features of the present invention will become more apparent from the following description taken in conjunction with the accompanying drawings.

DESCRIPTION OF THE PREFERRED EMBODIMENTS

In order to improve the positioning accuracy of the magnetic head, a head carriage assembly was previously proposed in a U.S. patent application Ser. No. 271,529, filed on Mar. 18, 1999, the disclosure of which is hereby incorporated by reference.

Figure 1:
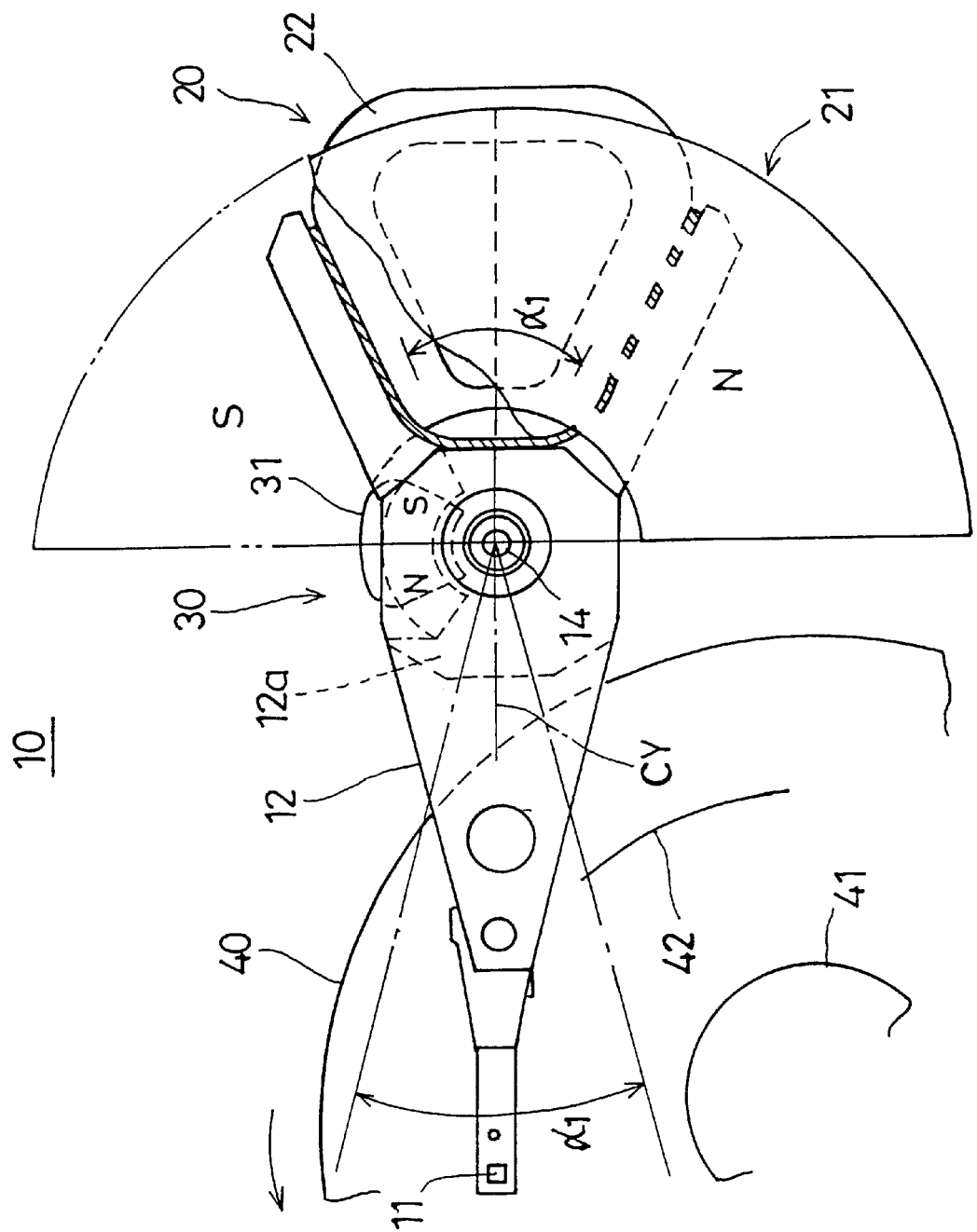
FIG. 1 illustrates a proposed magnetic head carriage assembly.

FIG. 1 illustrates a magnetic head carriage 10 of this proposed head carriage assembly. In the magnetic head carriage 10, a hub portion 12a of an arm-like head carriage 12 provided with a magnetic head slider 11 is rotatably supported by a rotational center shaft 14 on a chassis base 13 (shown in FIG. 2A). A primary magnetic driving unit 20 which operates during a seek operation is disposed on the base side of the head carriage 12. A secondary magnetic driving unit 30 which operates during a tracking operation is disposed on a side surface of the head carriage 12. The magnetic head carriage 10 is disposed near a magnetic disk 40 fixed to a spindle 41. When the magnetic disk 40 is rotating counterclockwise at high speed, the head carriage 12 rotates within an angle α1. Here, the magnetic head on the end surface of the magnetic head slider 11 moves to a desired track 42, thereby performing the seek operation, and the magnetic head follows the track 42, thereby performing the tracking operation.

The primary magnetic driving unit 20 is made up of a magnetic circuit body 21 fixed to the chassis base 13, and a driving coil 22 fixed to the head carriage 12. The secondary magnetic driving unit 30 operates during the tracking operation. The drive force generated during the tracking operation is smaller than the drive force required during the seek operation. Accordingly, the secondary magnetic driving unit 30 is a few times smaller than the primary magnetic driving unit 20.

Figure 3A:
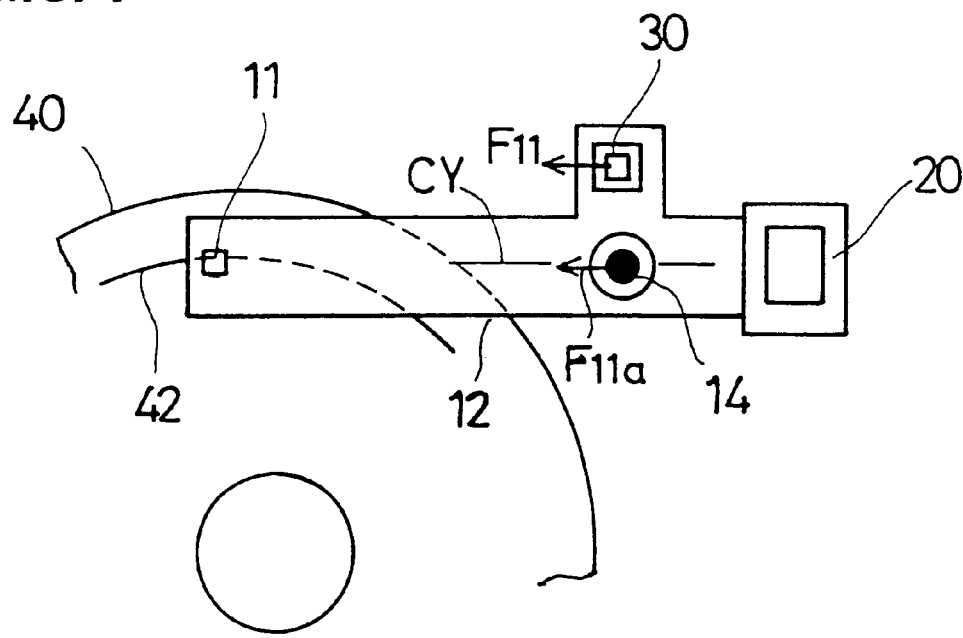
FIGS. 3A and 3B illustrate a tracking operation.
Figure 3B:
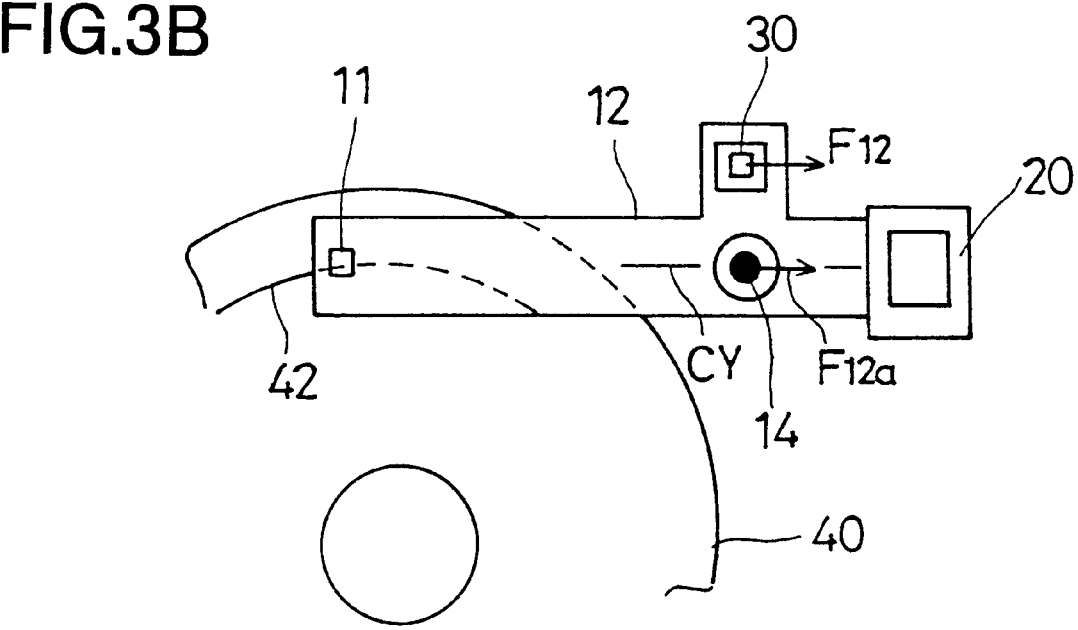

In the tracking operation after the seek operation, the secondary magnetic driving unit 30 generates a force F11 or a force F12, as shown in FIGS. 3A and 3B. The force F11 generated by the secondary magnetic driving unit 30 causes an equivalent translational force F11a to the rotational center shaft 14. The force F12 generated by the secondary magnetic driving unit 30 causes an equivalent translational force F12a to the rotational center shaft 14. The direction of the translational forces F11a and F12a is the same as the direction of an axial line which is the longitudinal direction of the head carriage 12. As for the magnetic head slider 11, the translational forces F11a and F12a are in the longitudinal direction of the track 42 of the magnetic disk 40, and not in the width direction of the track 42. Accordingly, the translational forces F11a and F12a act in such a direction that does not adversely influence the tracking operation, in which the magnetic head slider 11 follows the track 42 of the rotating magnetic disk 40. Thus, the magnetic head slider 11 can be accurately positioned for the track 42, and the tracking operation can be performed with a high precision.

Figure 2A:
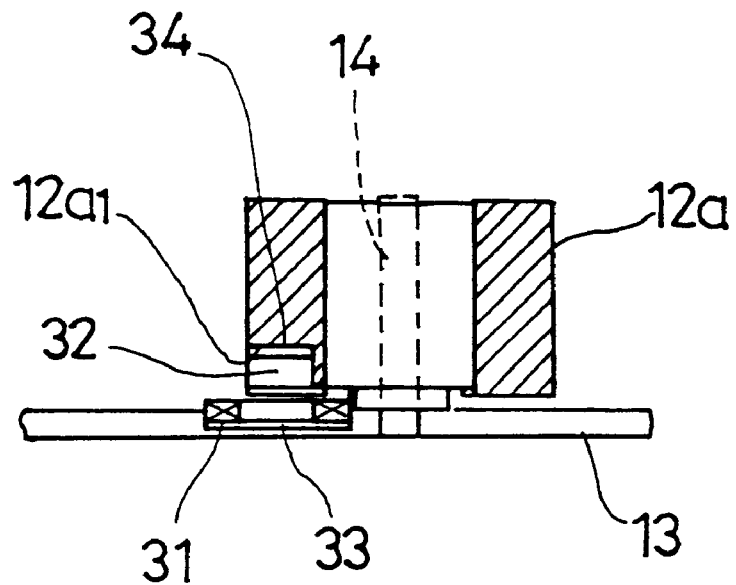
FIGS. 2A and 2B illustrate a secondary magnetic driving unit of the magnetic head carriage assembly of FIG. 1.
Figure 2B:
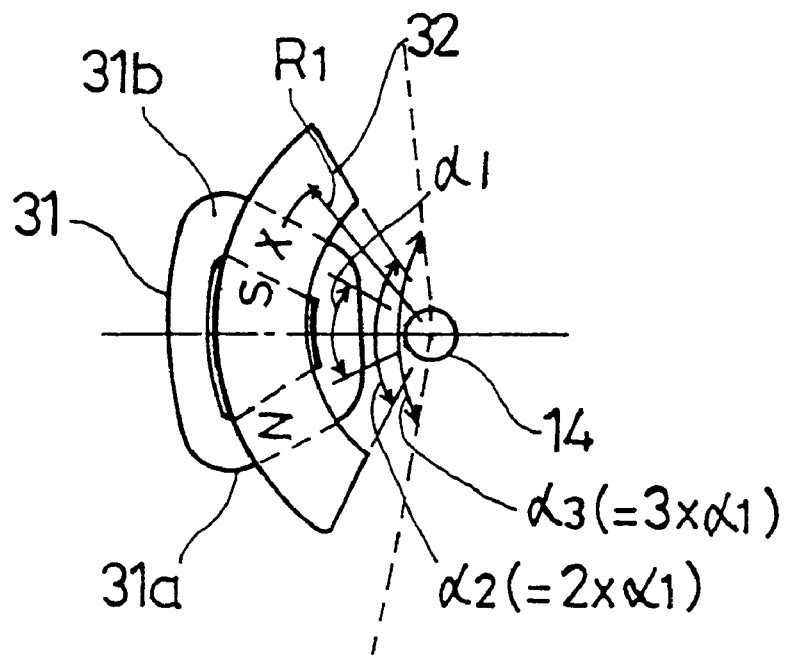

As shown in FIGS. 1, 2A, and 2B, the secondary magnetic driving unit 30 has a flat square driving coil 31, a permanent magnet 32, and yokes 33 and 34. The secondary magnetic driving unit 30 is of a movable magnet type. The yoke 34 is fixed inside a concave portion 12a1 on the lower surface of the hub portion 12a. The flat driving coil 31 is horizontally fixed onto the chassis base 31 by the lower surface of the yoke 33. The permanent magnet 32 is fixed to the lower surface of the yoke 34, and is situated in the concave portion 12a1 on the lower surface of the hub portion 12a. The permanent magnet 32 is an arcuate plate which is circumferentially divided at the center and is magnetized with two poles.

It is essential for the secondary magnetic driving unit 30 to properly operate wherever the head carriage 12 is situated. The opening angle between two sides 31a and 31b extending in the radial direction of the rotational center shaft 14 is set at an angle α1 which is the same as the rotational angle α1 of the head carriage. On the permanent magnet 32, an opening angle α2 is approximately twice as large as the opening angle α1, so that the magnetic poles of the permanent magnet 32 will not separate from the respective sides 31a and 31b of the driving coil 31, regardless of the rotational position of the head carriage 12. Furthermore, taking into consideration that the permanent magnet 32 moves with the head carriage 12, it is essential for the yoke 33 to have an opening angle α3 which is three times as large as the opening angle α1.

In view of this, the secondary magnetic driving unit 30 requires a space of a relatively large opening angle α3 corresponding to the opening angle α3 in the circumferential direction of a circle around the rotational center shaft 14.

The torque constant of the secondary magnetic driving unit 30 (the amount of torque generated per unit current), the consumption power and the size of the installation space have the following relationship. If the secondary magnetic driving unit 30 is moved away from the rotational center shaft 14, the torque constant can be made larger, and the consumption power can be reduced. However, the installation space in the circumferential direction of the secondary magnetic driving unit 30 becomes too wide to move the secondary magnetic driving unit 30 away from the rotational center shaft 41, due to the overall size of the magnetic disk drive. Accordingly, the secondary magnetic driving unit 30 is disposed inside the hub portion 12a of the head carriage 12, and is situated near the rotational center shaft 14. Because of this, the torque constant of the secondary magnetic driving unit 30 is small, and the consumption power in the tracking operation is large.

Also, there is an error in parallelism between the permanent magnet 32 and the yoke 33. If the width of the magnetic gap is uneven in the circumferential direction, i.e., is narrower at one side and wider at the other, the magnetic attraction of the permanent magnet 32 for the yoke 3 becomes uneven in the circumferential direction. In such a case, the permanent magnet 32 is magnetically attracted to the narrower side of the magnetic gap, thereby causing a bias which adversely affects the positioning of the magnetic head slider 11 for the track 42.

The following is a description of embodiments of the present invention, with reference to the accompanying drawings.

Figure 4:
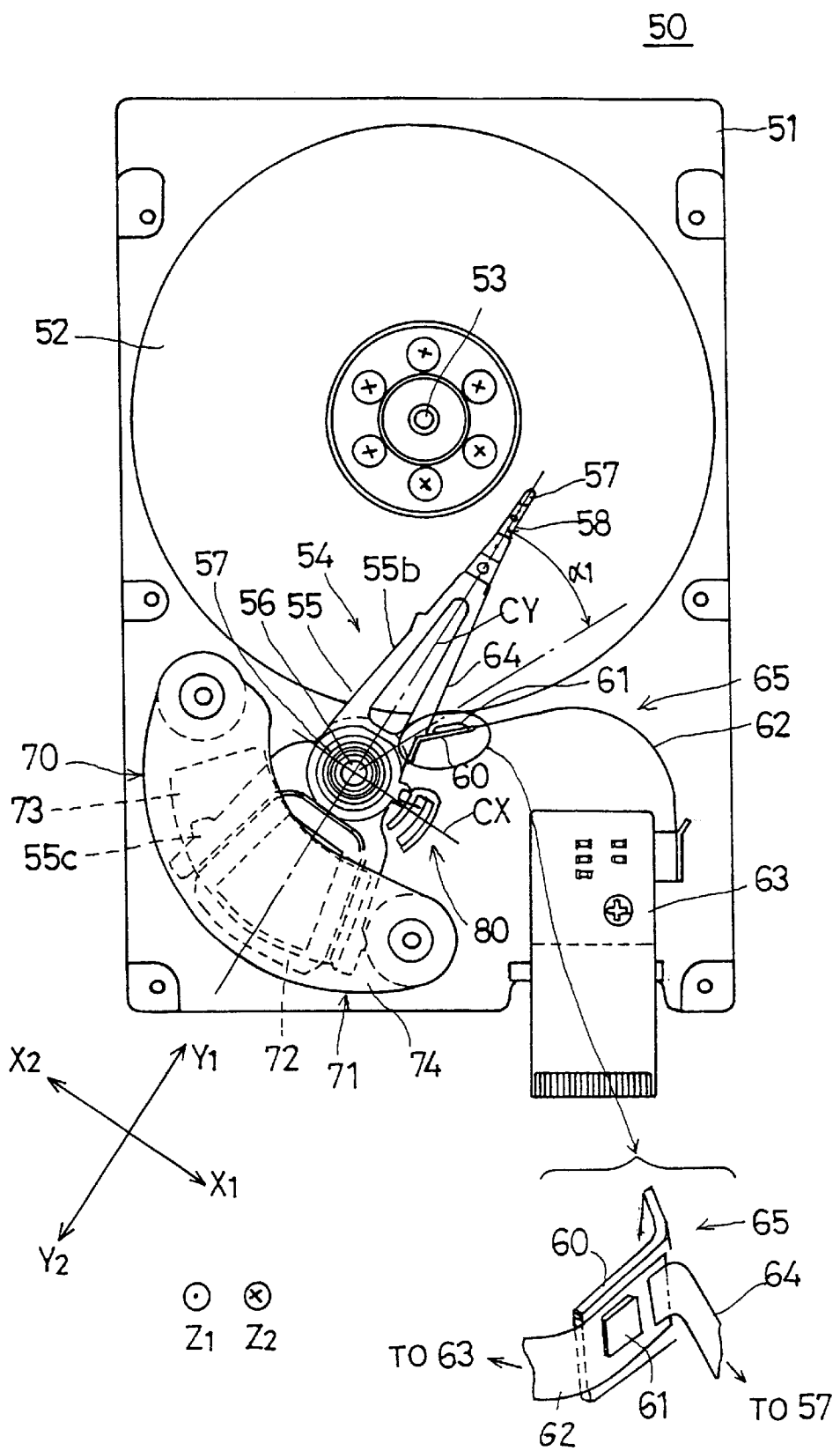
FIG. 4 illustrates a magnetic disk drive of one embodiment of the present invention.

FIG. 4 illustrates a magnetic disk drive 50 of one embodiment of the present invention. The magnetic disk drive 50 comprises a box-like chassis base 51, a magnetic disk 52, a spindle 53, and a magnetic head carriage assembly 54. The magnetic disk 52 is rotatably attached to the chassis base 51 by the spindle 53, and the magnetic heat carriage device 54 is incorporated into the chassis base 51.

The magnetic head carriage assembly 54 has an arm-like head carriage 55 which is provided with a magnetic head slider 57 at the leading edge, and is rotatable about a rotational center shaft 56. In FIG. 4, CY is the axial line extending in the longitudinal direction of the head carriage 55, which extends through the rotational center. shaft 56 and the magnetic head slider 57. CX extends through the rotational center shaft 56 and is perpendicular to the axial line CY. Y1 and Y2 indicate the directions of the axial line CY, X1 and X2 indicate the directions of the axial line CX, and Z1 and Z2 indicate the directions of an axial line CZ: that extends in the vertical direction. In the following description, the term "rotational center shaft 56" is also used to mean the center or the centerline of the rotational center shaft 56 in some contexts, as well as the rotational center shaft 56 itself.

The head carriage 55 comprises a hub portion 55a, an arm 55b extending from the hub portion 55a in the Y1 direction, and a fork-shaped portion 55c extending from the hub portion 55a in the Y2 direction. As shown in FIG. 6B, the rotational center shaft 56 stands vertically from the chassis base 51, and is provided with a ball bearing 59 which engages a through hole in the hub portion 55a of the head carriage 55. A head suspension 58 to which the magnetic head slider 57 having a magnetic head on its top is secured is attached to the Y1-direction edge of the arm 55b. The head carriage 55 rotates in the range of an angle α1, and the magnetic head slider 57 moves in the radial direction of the rotating magnetic disk 52. In FIG. 4, the magnetic head slider 57 is situated on the inner periphery side of the magnetic disk 52.

A small support plate 60 is fixed near the hub portion 55a of the head carriage 55. As shown on an enlarged scale in a part of FIG. 4, the edge of a flexible cable 62 is fixed onto the support plate 60, and a head IC 61 which amplifies :signals is mounted on the part of the flexible cable 62 secured to the support plate 60. The edge of a wire 64 extending along the arm 55b from the magnetic head slider 57 is connected to the edge of the flexible cable 62 on the support plate 60. The flexible cable 62 extends in the X1 direction from the edge of the support plate 60, and curves gently in the Y2 direction. The edge of the flexible cable 62 is connected to a circuit substrate 63. A wire route structure 65 starting from the magnetic head slider 57 and reaching the circuit substrate 63 is formed so as not to interfere with a secondary magnetic driving unit 80 mentioned later.

A primary magnetic driving unit 70 which operates at the time of seek is disposed on the Y2-direction side of the head carriage 55. The primary magnetic driving unit 70 is of a movable coil type, and is made up of a magnetic circuit body 71 secured onto the chassis base 51 and a flat square movable coil 72 horizontally secured onto the fork-shaped portion 55c. The magnetic circuit body 71 consists of a permanent magnet 73 and a yoke 74 which sandwich the movable coil 72 in the Z1–Z2 direction. The permanent magnet 73 is an arcuate plate, and is divided at the center to have two poles.

The secondary magnetic driving unit 80 is situated on the axial line CX and on the X1-direction side of the rotational center shaft 56. The secondary magnetic driving unit 80 operates at the time of tracking, and its driving force is smaller than a driving force required in a seek operation. Accordingly, the secondary magnetic driving unit 80 is a few times smaller than the primary magnetic driving unit 70. Unlike in the prior art shown in FIG. 1, the secondary magnetic driving unit 80 is disposed in a region outside the hub portion 55a in the plane views of FIGS. 4 and 6A. The region outside the hub portion 55a is distant from the rotational center shaft 56, and the torque constant is larger than in the prior art accordingly. The secondary magnetic driving unit 80 can be disposed at a distance from the rotational center shaft 56, because it only requires a smaller space than in the prior art.

Figure 5:
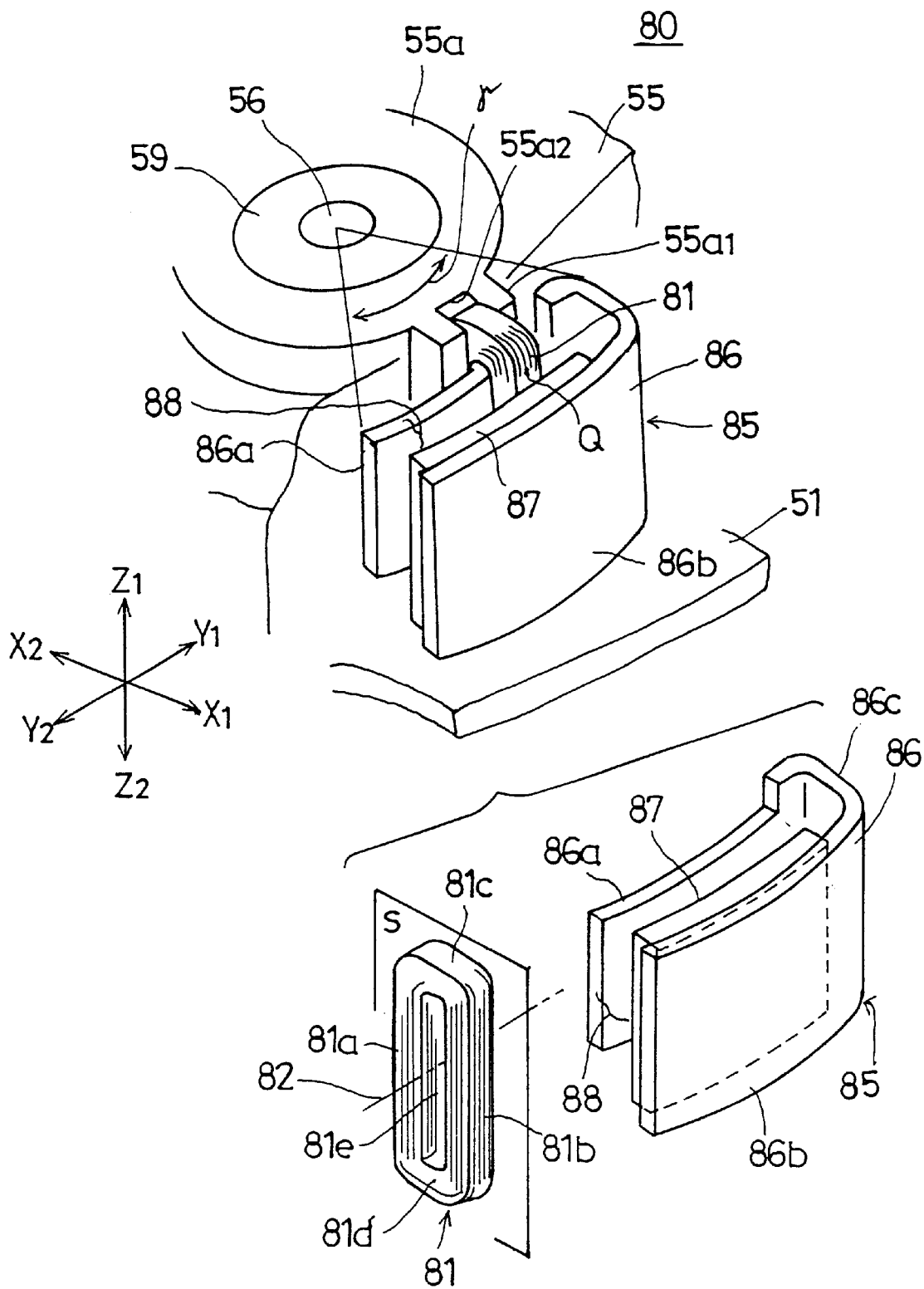
FIG. 5 is a perspective view of a. secondary magnetic driving unit of the magnetic disk drive of FIG. 4.
Figure 6A:
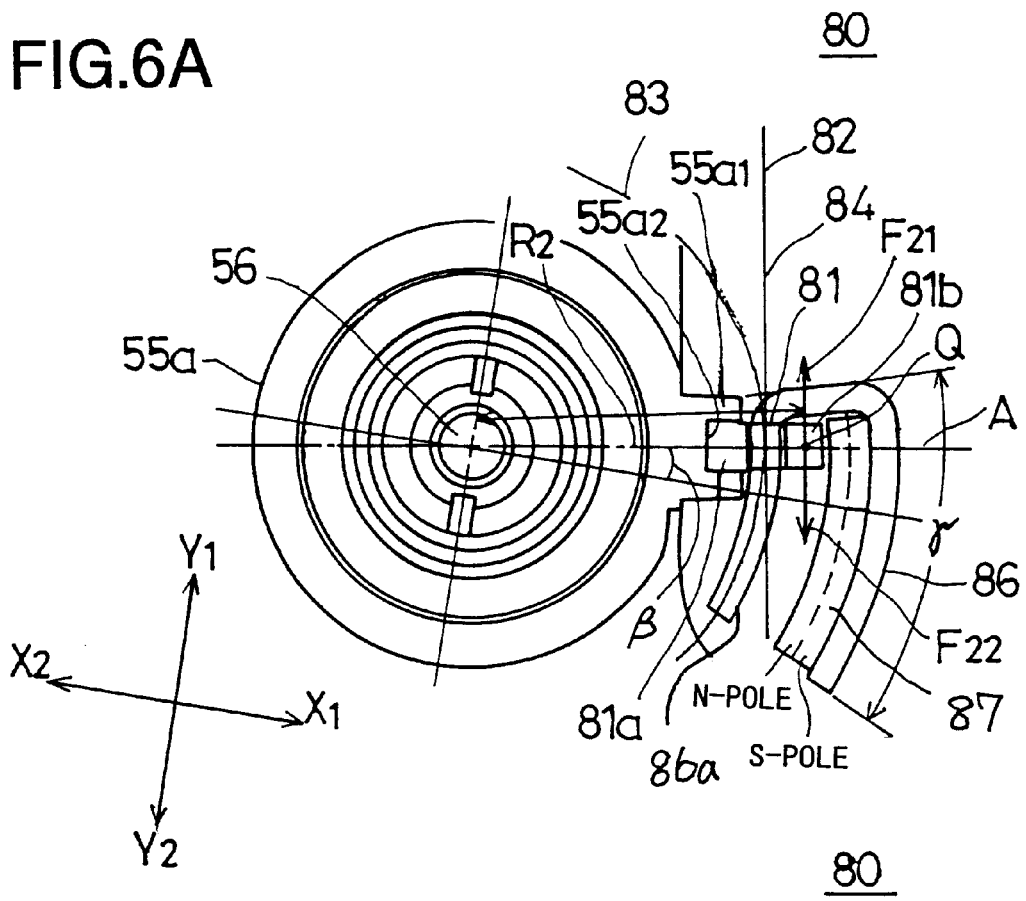
FIGS. 6A and 6B are enlarged views of the secondary magnetic driving unit.
Figure 6B:
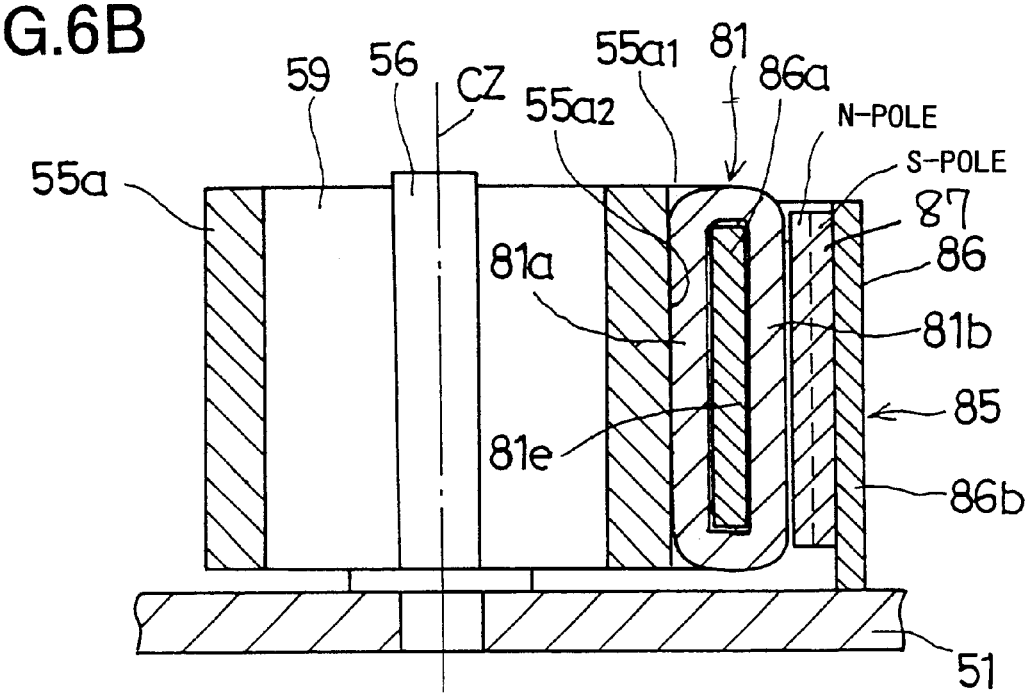

As shown in FIGS. 5, 6A, and 6B, the secondary magnetic driving unit 80 is of a movable coil type. A surface S vertical to the axial line 82 of a movable coil 81 is a surface including the rotational center shaft 56. In other words, the movable coil 81 is situated so that the axial line 82 is horizontal, and the movable coil 81 extends in the direction of a tangent line 84 of a circle 83 with the rotational center shaft 56 being the center. The movable coil 81 extends longitudinally, and two long dies 81a and 81b facing each other are vertical to the chassis base 51 and arranged in the radial direction of the circle 83.

The secondary magnetic driving unit 80 comprises a magnetic circuit body 85 fixed onto the chassis base 51 and the movable coil 81 fixed onto a side surface of the hub portion 55a.

The movable coil 81 has a rectangular shape having the long sides 81a and 81b, and short sides 81c and 81d. The movable coil 81 is provided with a rectangular opening 81e in the center, and fixed to a rib-like arm portion 55a1 protruding from a side surface of the hub portion 55a. The rib-like arm portion 55a1 is provided with a groove 55a2 extending in the Z1–Z2 direction on its leading edge. The movable coil 81 is secured by the long side 81a engaged with the groove 52a2. Accordingly, the surface S perpendicular to the axial line 82 of the movable coil 81 is situated on the surface including the rotational center shaft 56.

The arm portion 55a1 is situated on a line A extending through the rotational center shaft 56 at an angle β (approximately 10 degrees) with respect to the line CX counterclockwise, as shown in FIG. 6A. The angle β with respect to the line CX prevents the magnetic circuit body 85 from interfering with the fork-shaped portion 55c of the head carriage 55. Although the tangent line 84 is not in parallel with the line CY, the shift is small, and the tracking operation can be accurately performed as mentioned later.

The magnetic circuit body 85 is made up of a yoke 86 and a permanent magnet 87. The yoke 86 is U-shaped, and consists of two yoke side plates 86a and 86b, and a return yoke portion 86c connecting the two yoke side plates 86a and 86b. The yoke side plate 86a has a size corresponding to the opening 81e of the movable coil 81. The plate-like permanent magnet 87 is fixed to the inner surface of the yoke side plate 86b. The permanent magnet 87 is magnetized in the thickness direction (X1–X2 direction). The side of the yoke side plate 86b is S-pole, and the side of the yoke side plate 86a is N-pole. Here, a magnetic gap is formed between the yoke side plate 86a and the permanent magnet 87. The size of the magnetic gap 88 corresponds to the long side 81b of the movable coil 81.

The magnetic circuit body 85 is fixed to the chassis base 51 by the yoke side plate 86b penetrating through the opening 81e of the movable coil 81, with a little room being left in the opening 81e. The long side 81b of the movable coil 81 is engaged with the magnetic gap 88, with a little room left, and extends in the Z-1–Z2 direction. The yoke side plate 86a serves as the iron core of the movable coil 81.

The yoke side plates 86a and 86b and the permanent magnet 87 are arcuate about the rotational center shaft 56. The magnetic gap 88 also ahs an arcuate shape about the rotational center shaft 56. Accordingly, the distribution of the magnetic flux across the magnetic gap 88 in the radial direction of the circle 83 is substantially uniform on the circumference. Since the yoke 86 has a U-shape, the magnetic circuit body 85 is small in size.

When the head carriage 55 rotates, the opening 81e of the movable coil 81 moves along the yoke side plate 86a (the iron core), and the long side 81b moves inside the magnetic gap 88.

The operation of the magnetic disk drive 50 will now be described.

With the magnetic disk 52 rotating counterclockwise at high speed, the head carriage 54 rotates in the range of the angle α1, and the magnetic head on an end surface of the magnetic head slider 57 moves to a desired track 52a, thereby performing the seek operation. Also, the tracking operation, in which the track 52a is followed, is performed.

Figure 7:
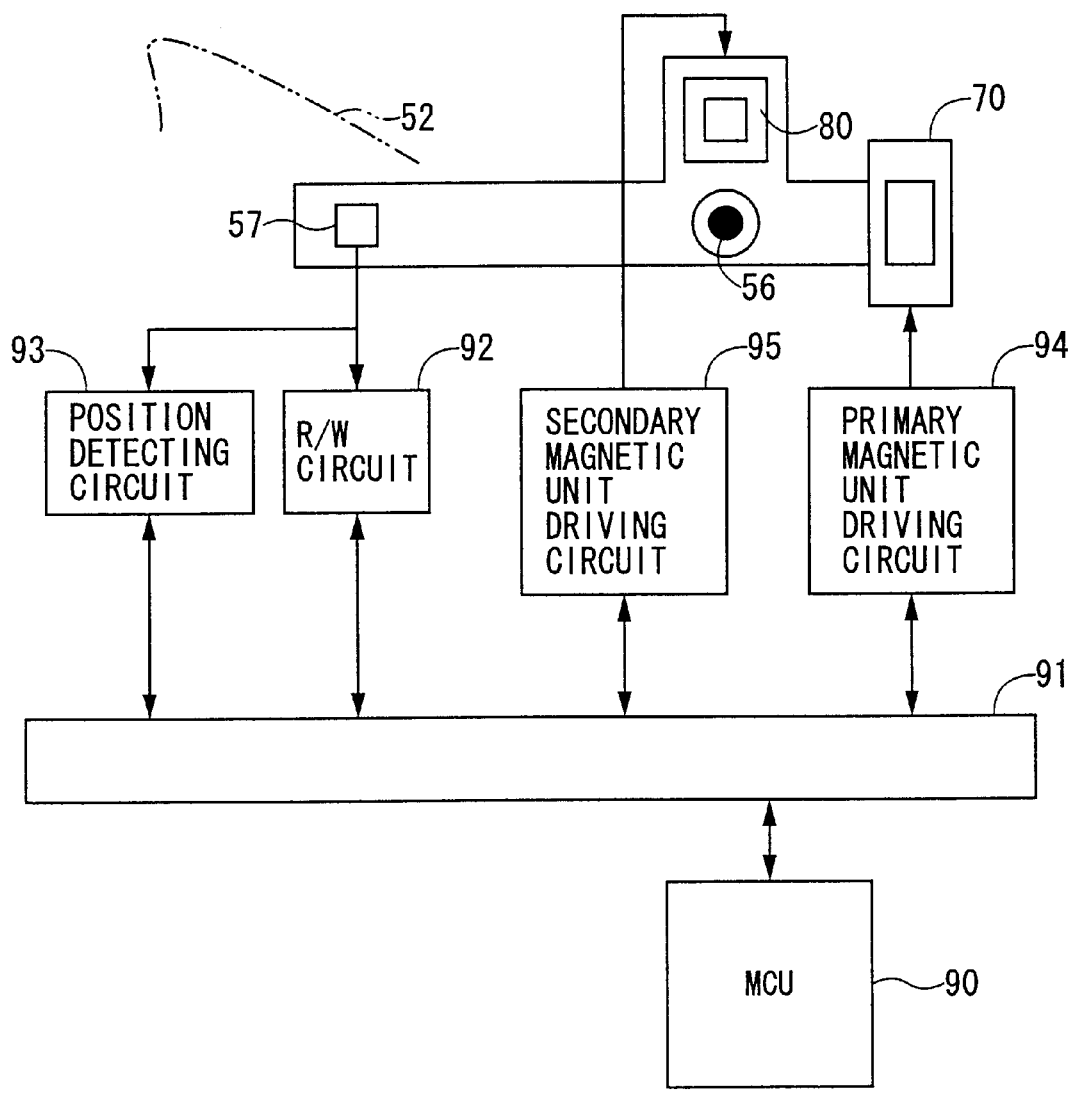
FIG. 7 is a block diagram of a circuit in the magnetic head carriage.

When the magnetic disk drive 50 operates, the magnetic head carriage 54 operates under the control of a microcontroller unit (MCU) 90, as shown in FIG. 7. In this figure, reference numeral 91 indicates a bus. At the time of reading, a read/write circuit 92 reads information which the magnetic head slider 57 has picked up from the rotating magnetic disk 52. At the time of writing, the magnetic head slider 57 writes information outputted from the read/write circuit 92 into the magnetic disk 52. A position detecting circuit 93 detects the track 52a on the magnetic disk 52, which the magnetic head slider 57 is tracing, in accordance with the information picked up from the rotating magnetic disk 52 by the magnetic head slider 57.

Switching between the seek operation and the tracking operation is conducted in accordance with instructions from the MCU 90. When a seek instruction is issued from the MCU 90, a primary magnetic unit driving circuit 94 starts operating. A drive current is then supplied to the movable coil 72 (shown in FIG. 4), so that the primary magnetic driving unit 70 starts operating. The head carriage 54 than rotates to carry the magnetic head slider 57 to a desired track.

When the magnetic head slider 57 reaches the desired track, a tracking instruction is issued from the MCU 90. The primary magnetic driving unit 70 then stops operating, and a secondary magnetic unit driving circuit 95 starts operating. The secondary magnetic unit driving circuit 95 supplies a drive current to the movable coil 81 in accordance with information from the position detecting circuit 93. The secondary magnetic driving unit 80 then starts operating, and the head carriage 54 rotates by a small angle by the movement of the movable coil 81. The magnetic head slider 57 then follows the track 52a of the rotating magnetic disk 52. It is also possible to supply a drive current to the movable coil 81 at the time of the seek.

Figure 8A:
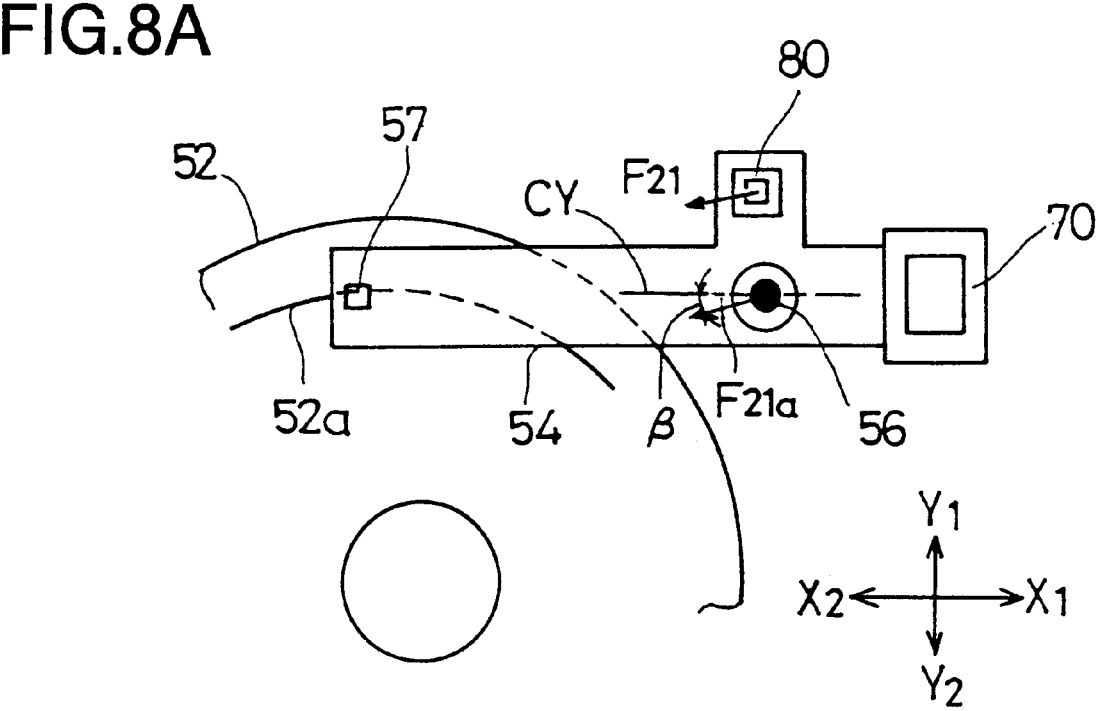
FIGS. 8A and 8B illustrate a tracking operation in the present invention.
Figure 8B:
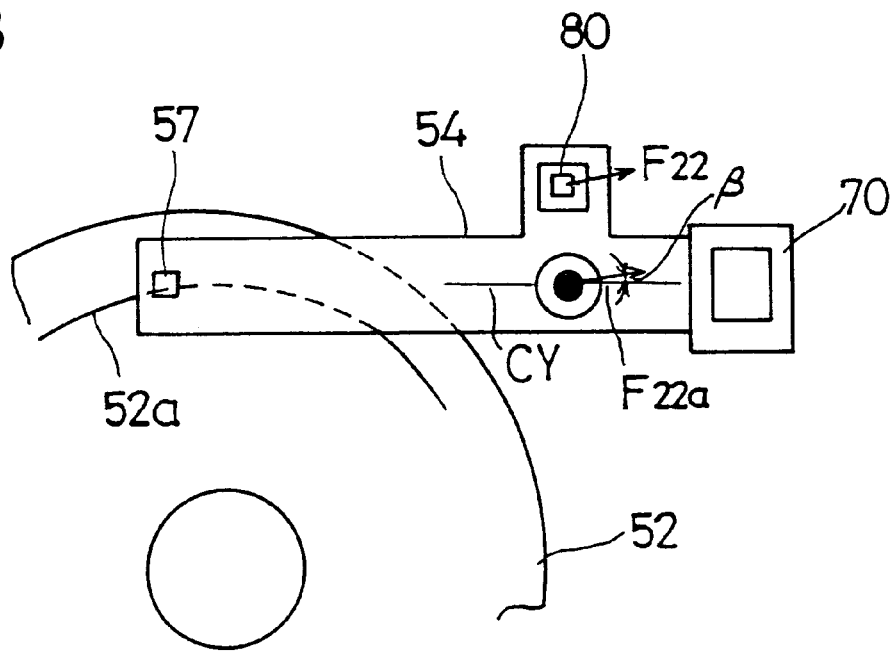

At the time of the tracking operation, the secondary magnetic driving unit 80 generates a force F21 or a force F22, as shown in FIGS. 8A and 8B. The force F21 generated by the secondary magnetic driving unit 80 causes a translational force F21a to the rotational center shaft 56. The force F22 generated by the secondary magnetic driving unit 80 causes a translational force F22a to the rotational center shaft 56. The directions of the translational forces F21a and F22a are no exactly the same direction as the axial line CY, which is the longitudinal direction of the head carriage 55, but the deviation from the axial line CY is only a small angle β (approximately 10 degrees). With respect to the magnetic head slider 42, the directions of the translational forces F21a and F22a are substantially the same as the longitudinal direction of the track 52a of the magnetic disk 52. Accordingly, the translational forces F21a and F22a act in such directions that have no adverse influence on positioning of the magnetic head slider 57 for the track 52a, i.e., in such directions that have no adverse influence on the tracking operation of the magnetic head slider 57 following the track 52a of the rotating magnetic disk 52. Thus, the magnetic head slider 57 is highly accurately positioned for the track 52a, thereby performing a high-precision tracking operation.

As shown in FIG. 6A, an opening angle γ about the rotational center shaft 56 of the magnetic circuit body 85 fixed to the chassis base 51 is substantially the same as the rotational angle α1. The movable coil 81 and its movement are included in the range of the opening angle γ. The secondary magnetic driving unit 80 can be accommodated within the range of the opening angle γ, taking into consideration the movement of the movable coil 81. Accordingly, the secondary magnetic driving unit 80 is as small as a third of the size of the secondary magnetic driving unit 30 shown in FIGS. 1, 2A, and 2B.

Even if the secondary magnetic driving unit 80 is disposed at a distance from the rotational center shaft 56, the space required for the secondary magnetic driving unit 80 is small. Accordingly, the secondary magnetic driving unit 80 is disposed at a longer distance from the rotational center shaft 56 than in FIGS. 1, 2A, and 2B, and is situated outside the hub portion 55a in the limited space of the magnetic disk drive 50.

The distance (radius) R2 between the rotational center shaft 56 and a point Q where the force F21 or the force F22 is generated is about twice the distance (radius) R1 in the secondary magnetic driving unit 30 shown in FIGS. 1, 2A, and 2B. Accordingly, the torque constant is almost twice as large as that of FIGS. 1, 2A, and 2B. As a result, the current value of the drive current flowing into the movable coil 81 in the tracking operation is almost a half of that in FIGS. 1, 2A, and 2B, and the power consumption of the magnetic disk drive 50 (or the magnetic head carriage assembly 54) can be reduced compared therewith.

The permanent magnet 87 of the secondary magnetic driving unit 80 is situated at a distance from the magnetic disk 52, so that the magnetic force of the permanent magnet 87 will not influence the information recorded in the magnetic disk 52. In view of this, to employ the secondary magnetic driving unit 80, it is not necessary to make modifications to the other component constituting the magnetic disk drive 50. Also, depending on the position of the support plate 60, the secondary magnetic driving unit 80 can be disposed on the opposite side of the rotational center shaft 56, and can have the same effects.

It should be noted that the magnetic head carriage assembly 54 operates without causing the secondary magnetic driving unit 80 to interfere with the wire route structure 65 including components from the magnetic head slider 57 to the circuit substrate 63.

[Modifications of the Secondary Magnetic Driving Unit]

[First Modification]

Figure 9:
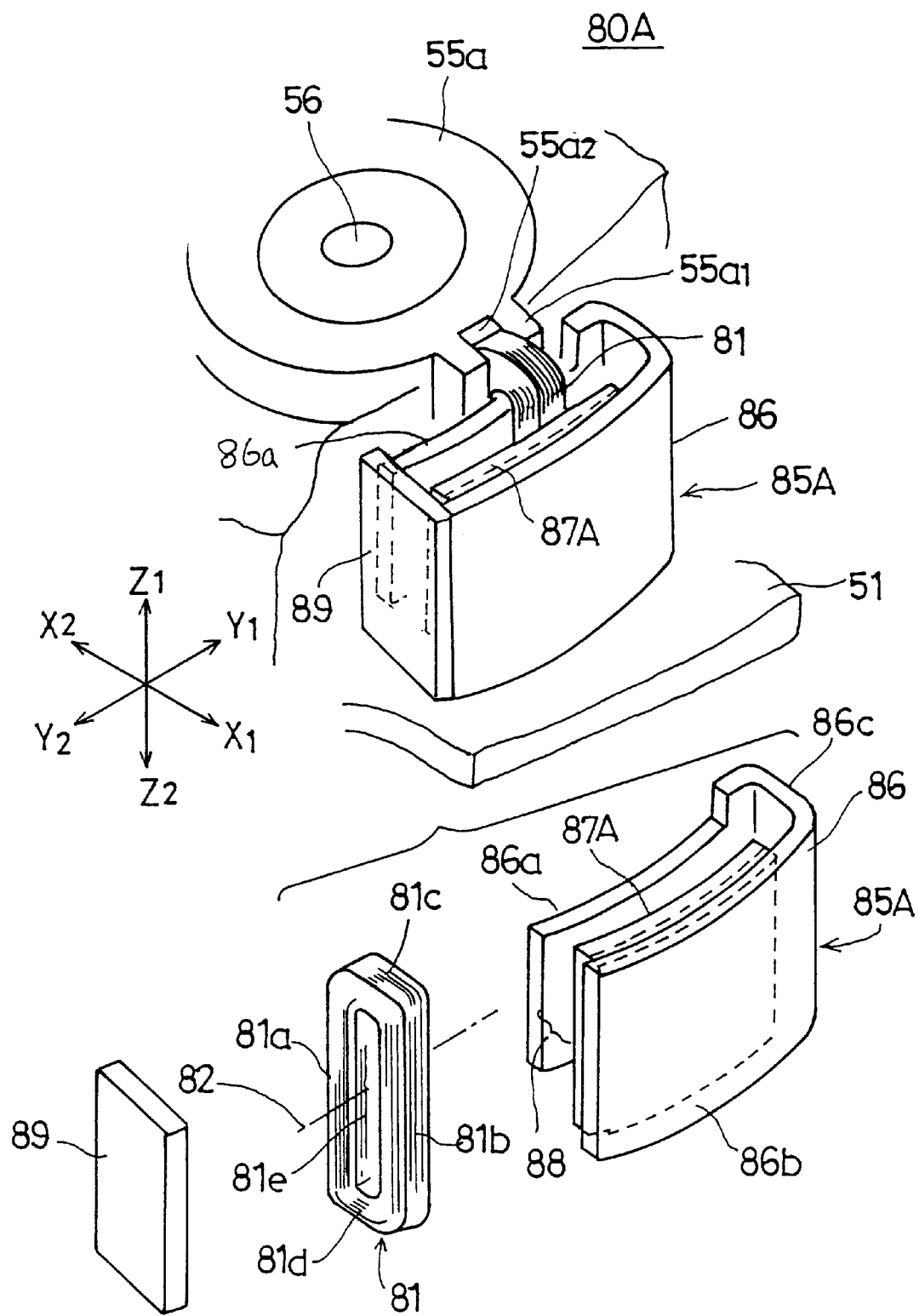
FIG. 9 is a perspective view of a first modification of the secondary magnetic driving unit.

FIG. 9 illustrates a secondary magnetic driving unit 80A of a first modification. The secondary magnetic driving unit 80A differs from the secondary magnetic driving unit 80 of FIG. 5 in the magnetic circuit body. The magnetic circuit body 85A includes a return yoke 89 which is not included in the magnetic circuit body 85 shown in FIG. 5. The return yoke 89 is bonded to the yoke 86, and connects the ends of the two yoke side plates 86a and 86b.

In the magnetic circuit body 85 shown in FIG. 5, the maximum strength of the permanent magnet 87 is determined by the sectional area of the return yoke portion 86c (the magnetic saturation of the return yoke portion 86c). In the magnetic circuit body 85A, on the other hand, both ends of each of the yoke side plates 86a and 86b are connected by the return yoke portion 86c and the return yoke 89, and the yoke 86 and the return yoke 89 are not liable to be magnetically saturated. Therefore, the permanent magnet 87A has a stronger magnetic force than the permanent magnet 87 shown in FIG. 5. Accordingly, the magnetic flux density in the magnetic gap 88 is higher than that of the magnetic circuit body 85 shown in FIG. 5. As a result, the torque constant of the secondary magnetic driving unit 80A is larger than that of the secondary magnetic driving unit 80 shown in FIG. 5.

[Second Modification]

Figure 10:
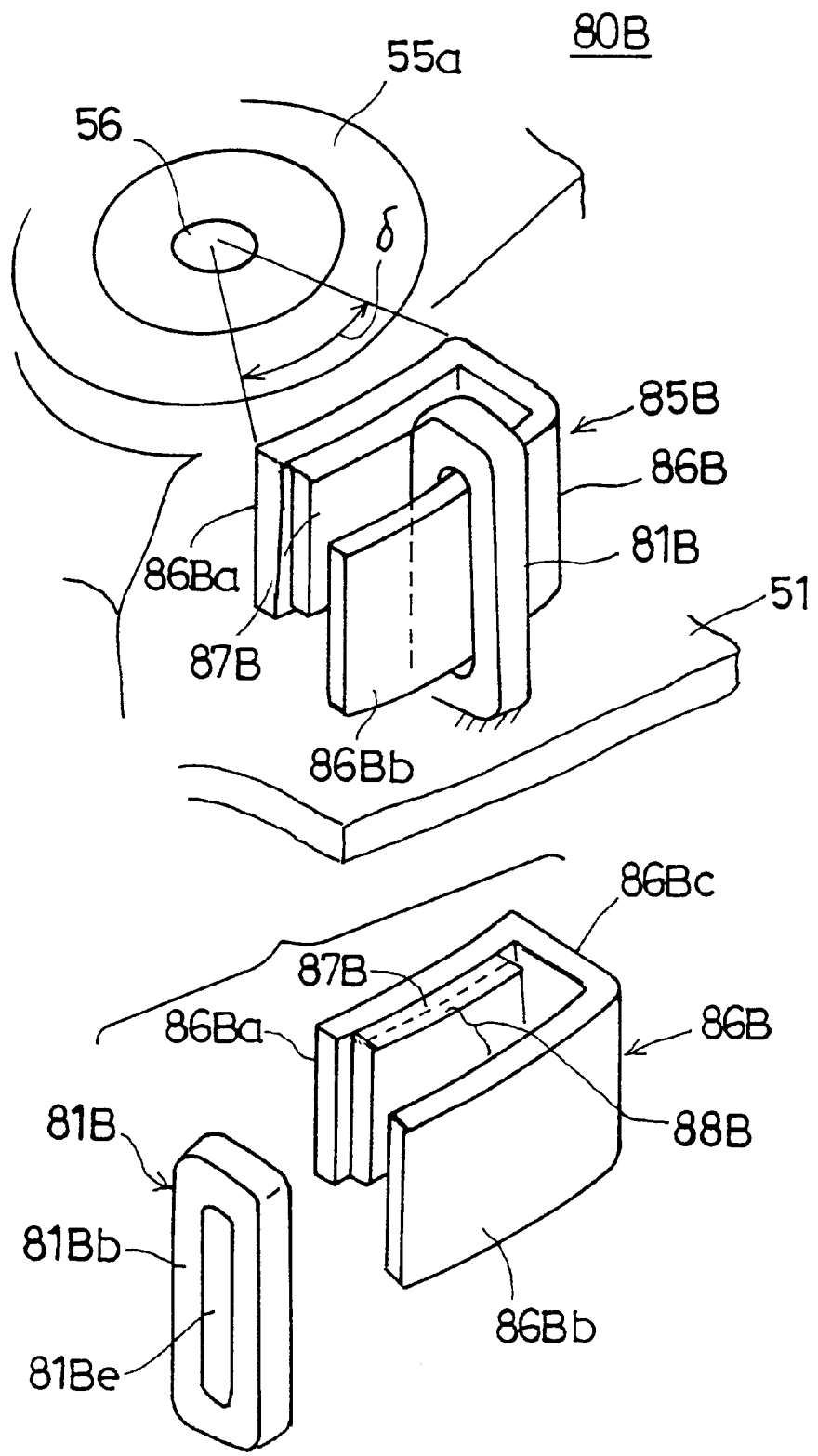
FIG. 10 is a perspective view of a second modification of the secondary magnetic driving unit.

FIG. 10 illustrates a secondary magnetic driving unit 80B of a second modification. The secondary magnetic driving unit 80B is of a movable magnet type. A magnetic circuit body 85B is secured to a side surface side of the hub portion 55a of the head carriage 55, and a coil 81B is secured onto the chassis base 51 in the same manner as the movable coil 81 shown in FIG. 5.

The magnetic circuit body 85B is made up of a yoke 86B and a permanent magnet 87B. The yoke 86B is U-shaped, and is made up of two facing yoke side plates 86Ba and 86Bb, and a return yoke portion 86Bc which connects the two yoke side plates 86Ba and 86Bb. The permanent magnet 87B is magnetized in the thickness direction (X1–X2 direction), and is secured to the inner surface of the yoke side plate 86Ba. There is a magnetic gap 88B formed between the permanent magnet 87B and the yoke side plate 86Ba.

The yoke side plate 86Ba penetrates through a rectangular opening 81Be in the center of the coil 81B, and serves as an iron core of: the coil 81B. A long side 81Bb of the coil 81B extends in the Z1–Z2 direction in the magnetic gap 88B,, with a little room being allowed.

When a drive current is supplied to the coil 81B in response to a tracking command, the magnetic circuit body 85B is actuated, and the magnetic circuit body 85B is moved so that the long side 81Bb of the coil 81B moves relatively in the magnetic gap 88B. The head carriage 54 is then rotated by a small angle, and the magnetic head slider 57 follows a track of the rotating magnetic disk, thereby performing the tracking operation.

As for the size of the secondary magnetic driving unit 80B, the coil 81B is accommodated in the magnetic circuit body 85, as shown in FIG. 10, and an opening angle δ about the rotational center shaft 56 of the magnetic circuit body 85B is substantially the same as the rotation angle α1 of the head carriage 55 shown in FIG. 4. Accordingly, the size of the secondary magnetic driving unit 80B is as small as two thirds of the size of the secondary magnetic driving unit 30 shown in FIGS. 1, 2A, and 2B. Thus, the secondary magnetic driving unit 80B is disposed outside the hub portion 55a at a long distant from the rotational center shaft 56. Here, the torque constant of the secondary magnetic driving unit 80B is larger than FIGS. 1, 2A, and 2B.

[Third Modification]

Figure 11:
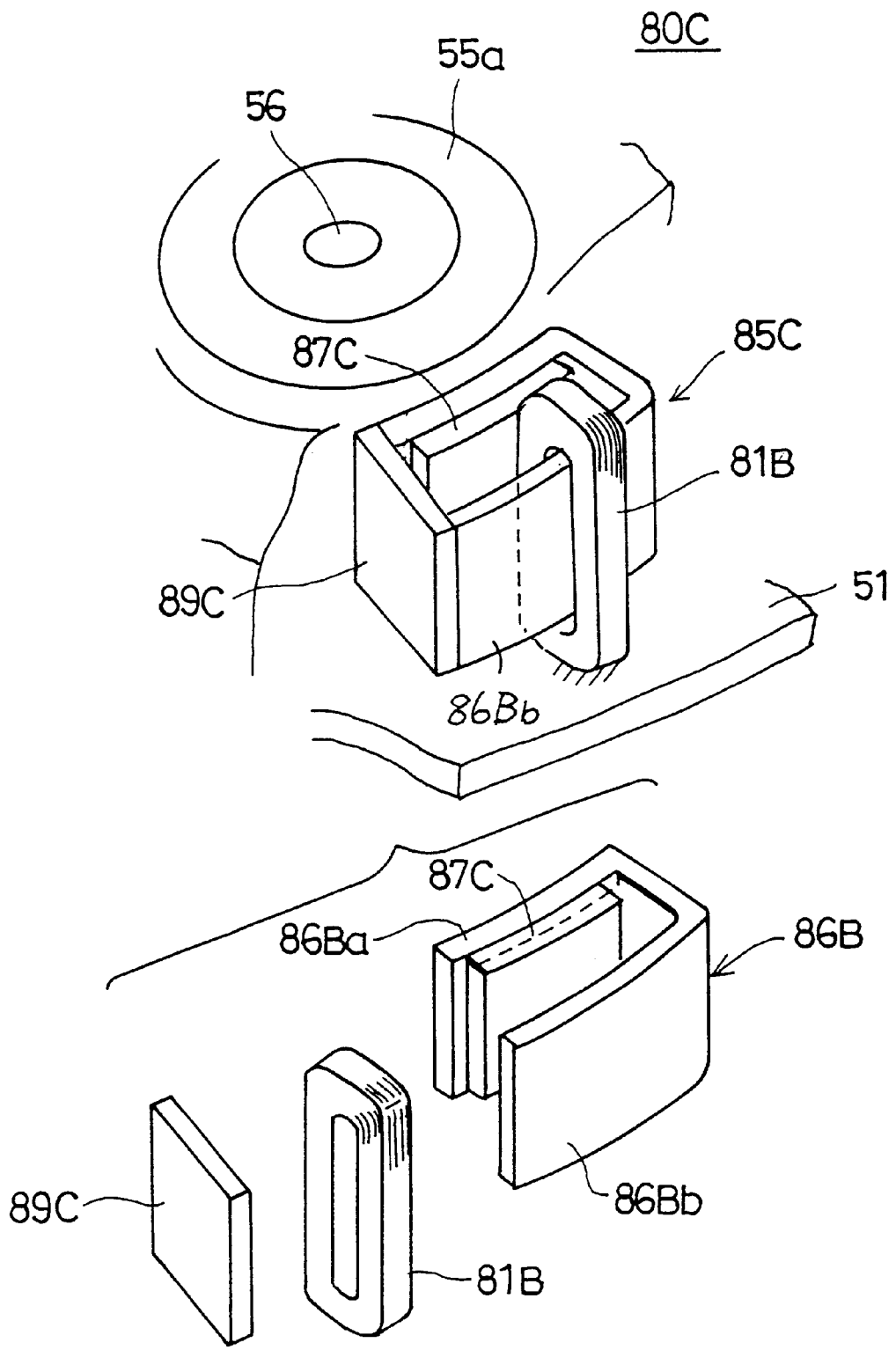
FIG. 11 is a perspective view of a third modification of the secondary magnetic driving unit.

FIG. 11 illustrates a secondary magnetic driving unit 80C of a third modification. The secondary magnetic driving unit 80C is substantially the same as the secondary magnetic driving unit 80B, except that it further includes a return yoke 89C. The return yoke 89C is attached to the yoke. 86B, and connects the ends of the two yoke side plates 86Ba and 86Bb.

The magnetic saturation of the return yoke 89C is not easily achieved, and therefore, the permanent magnet 87C has a greater magnetic force than the permanent magnet 87B shown in FIG. 10. Thus, the torque constant of the secondary magnetic driving unit 80C has a larger torque constant than the secondary magnetic driving unit 80B shown in FIG. 10.

[Fourth Modification]

Figure 12:
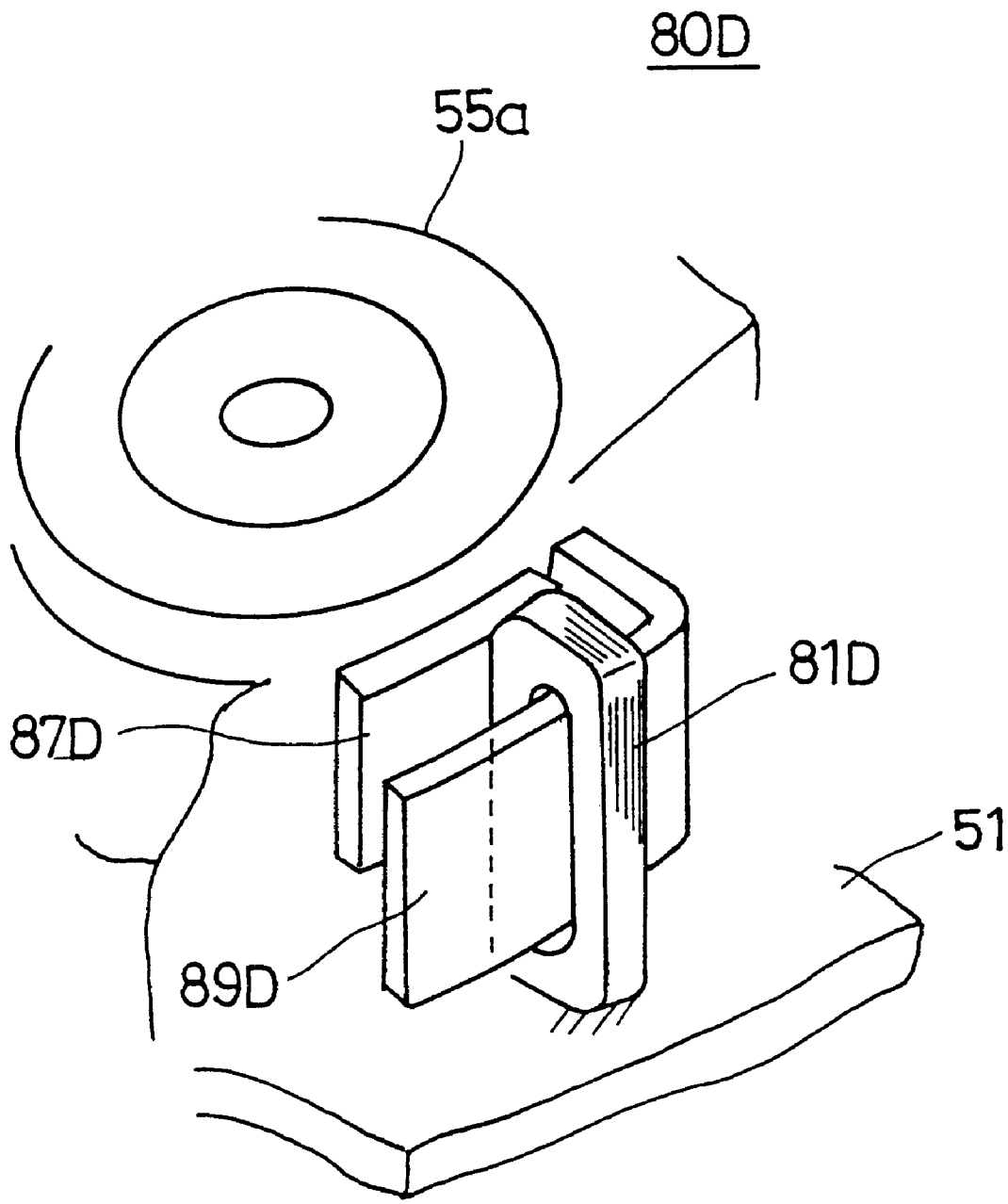
FIG. 12 is a perspective view of a fourth modification of the secondary magnetic driving unit.
Figure 13A:
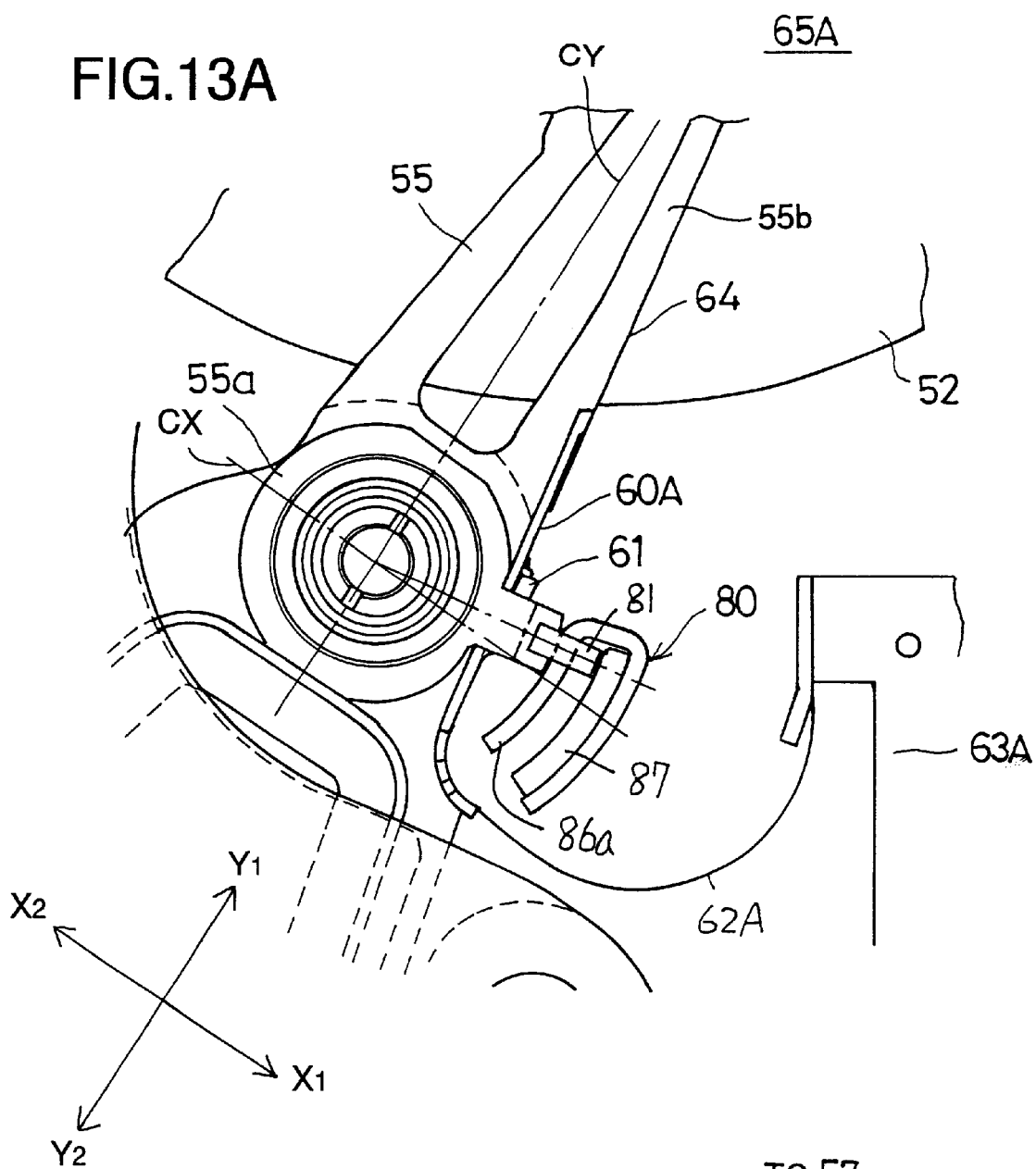
FIGS. 13A and 13B illustrate a first modification of the wire route structure.
Figure 13B:
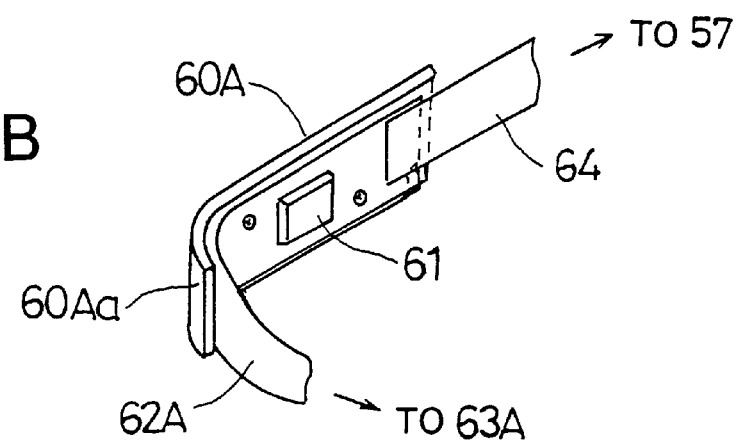
Figure 14A:
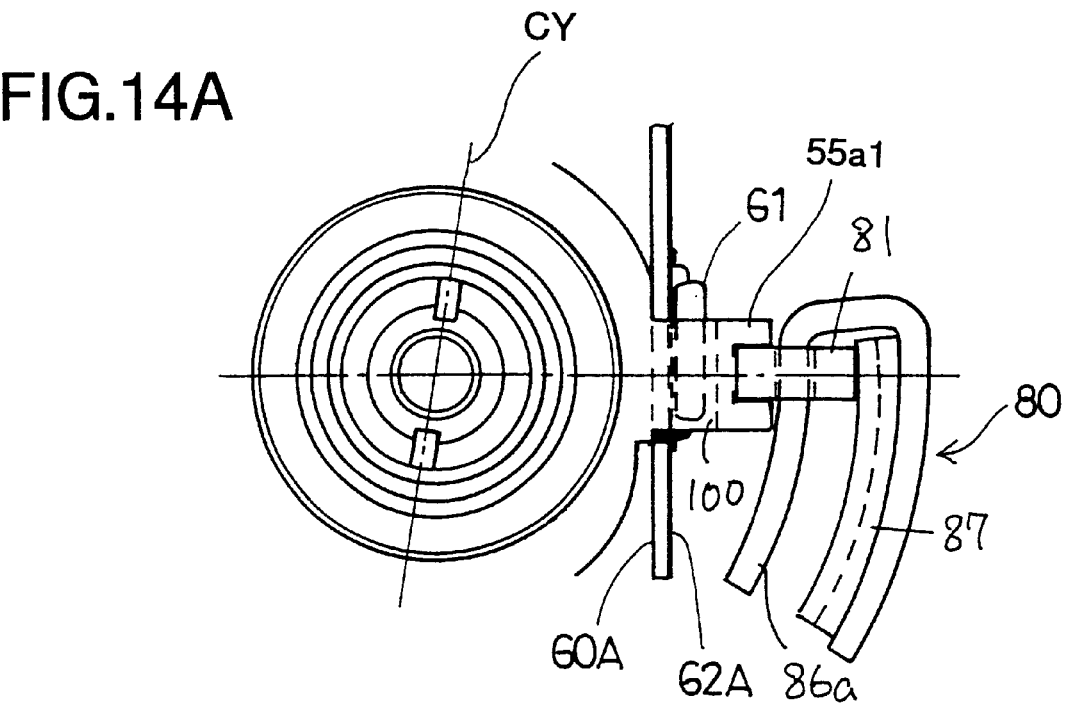
FIGS. 14A and 14B illustrate the wire route in the hub portion of FIGS. 13A and 13B.
Figure 14B:
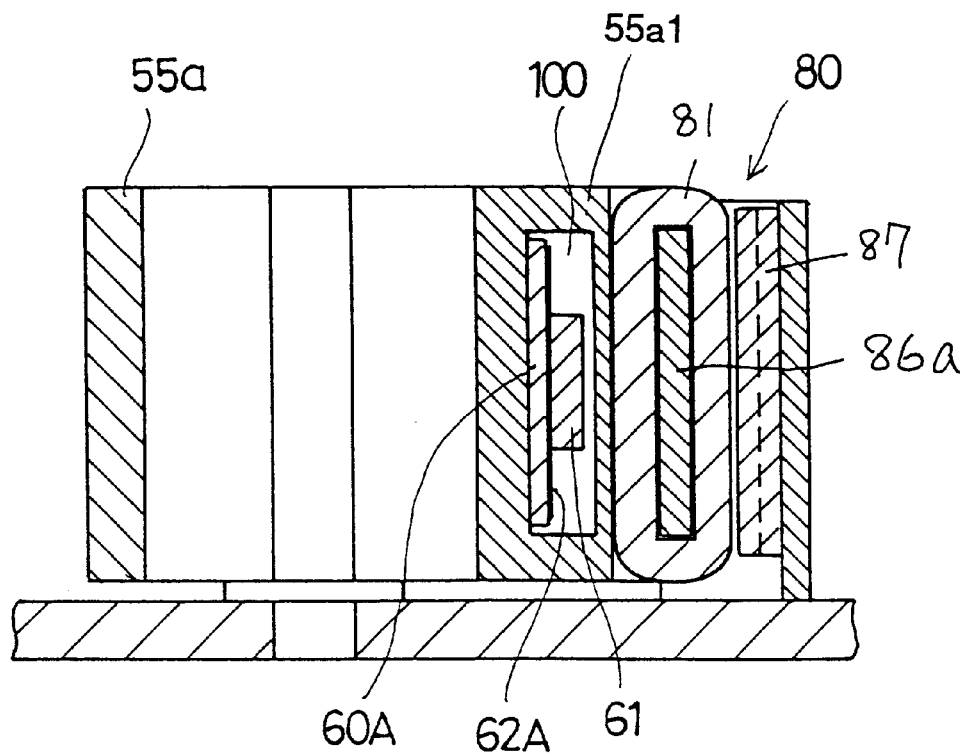

FIG. 12 illustrates a secondary magnetic driving unit 80D of a fourth modification. The secondary magnetic driving unit 80D is the same as the secondary magnetic driving unit 80B, except that the hub portion 55a of the head carriage is made of a magnetic material, and that an L-shaped yoke 89D protrudes from the hub portion 55a and is integrally formed with the hub portion 55a. A permanent magnet 87D is attached to the peripheral surface of the hub portion 55a. A coil 81D is secured onto the chassis base 51 and engaged with the yoke 89D.

Since the yoke 89D is integrally formed with the hub portion 55a, it is not necessary to form an independent yoke, thereby reducing the number of components.

[Modifications of the Wire Route Structure]

[First Modification]

FIGS. 13A, 13B, 14A, and 14B illustrate a wire route structure 65A of a first modification. In the wire route structure 65A, a tunnel 100 is formed in the hub portion 55a of the head carriage 55. More specifically, the tunnel 100 is formed substantially in parallel with the axial line CY at the base of the arm portion 55a1.

The end of a flexible cable 62A is secured onto the entire surface of a support plate 60A, and the head IC 61 is mounted on the part of the flexile cable 62A secured to the support plate 60A. The support plate 60A penetrates through the tunnel 100 and is screwed to the side surface of the hub portion 55a. The head IC 61 is situated within the tunnel 100.

The end of the wire 64 extending from the magnetic head slide 57 along the arm 55b is connected to the end of the flexible able 62a at the Y1-direction end of the support plate 60A.

The flexible cable 62A extends from the Y2-direction end of the support plate 60A, and gently curves toward a circuit substrate 63A. Here, the end of the flexible cable 62A is connected to the circuit substrate 63A. The support plate 60A has a right-angled curved portion 61Aa which curves at the Y2-direction end substantially at right angle. The flexible cable 62A extends in the X1 direction from the hub portion 55a of the head carriage 55.

The wire route structure 65A exists on the rotational center shaft 56 side of the secondary magnetic driving unit 80, and extends in the X1 direction from a point on the Y2 side of the secondary magnetic driving unit 80 so as not to interfere with the secondary magnetic driving unit 80.

[Second Modification]

Figure 15A:
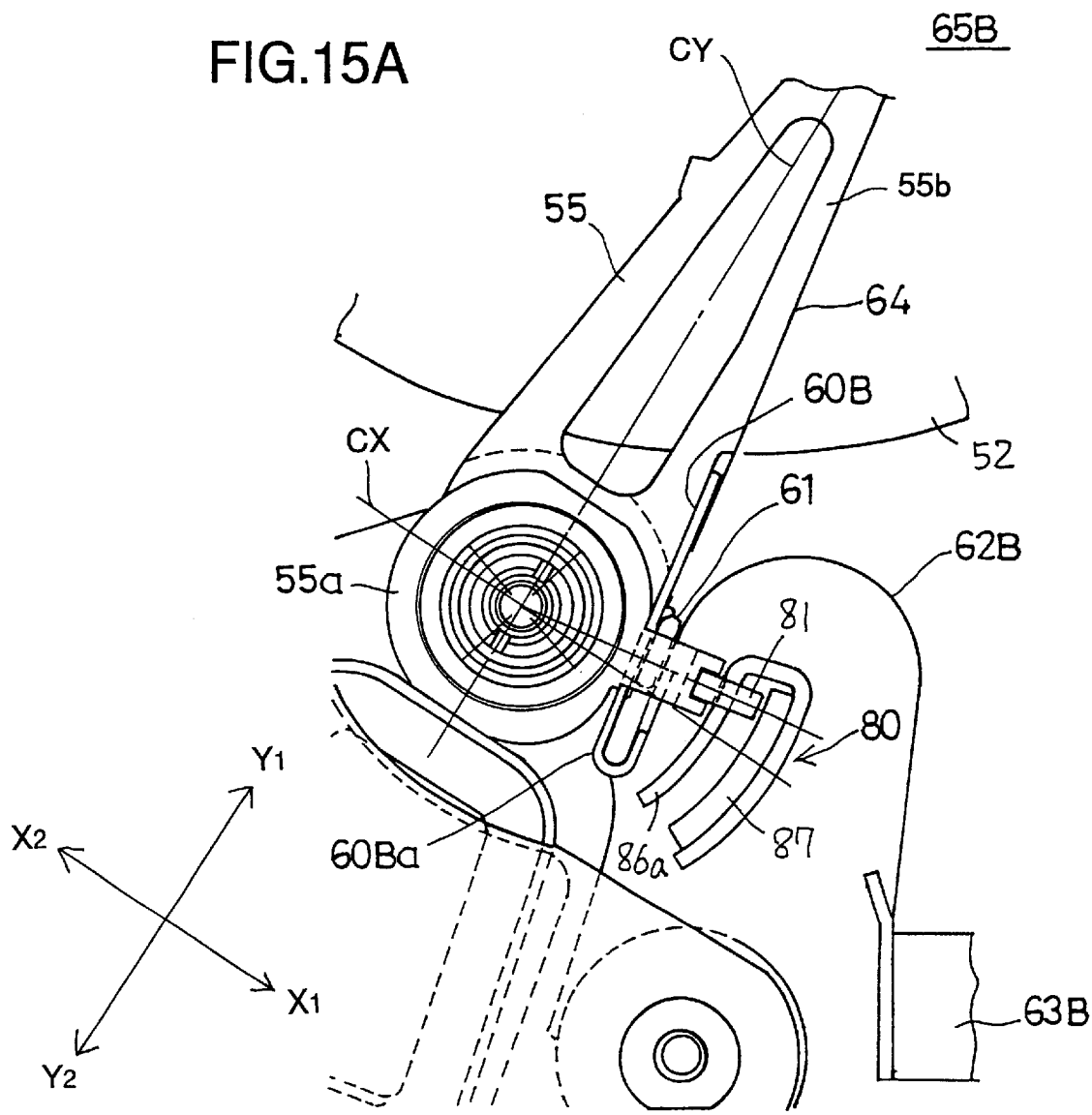
FIGS. 15A and 15B illustrate a second modification of the wire route structure.
Figure 15B:
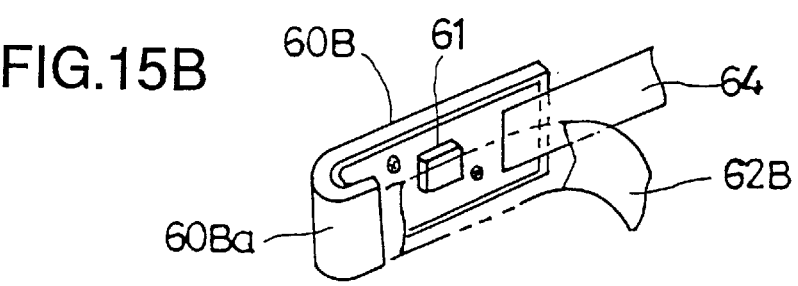

FIGS. 15A and 15B illustrate a wire route structure 65B of a second modification. A support plate 60B has a folded curved portion 60Ba which is folded at the Y2-direction end. The support plate 60B penetrates through the tunnel 100 and is screwed to the side surface of the hub portion 55a. A flexible cable 62B extends in the Y1 direction from the folded curved portion 60Ba, and then extends in the X1 direction from a point on the Y1 side of the secondary magnetic driving unit 80. The flexible cable 62B then curves gently in the Y2 direction, and the end of the flexible cable 62B is connected to a circuit substrate 63B.

[Third Modification]

Figure 16:
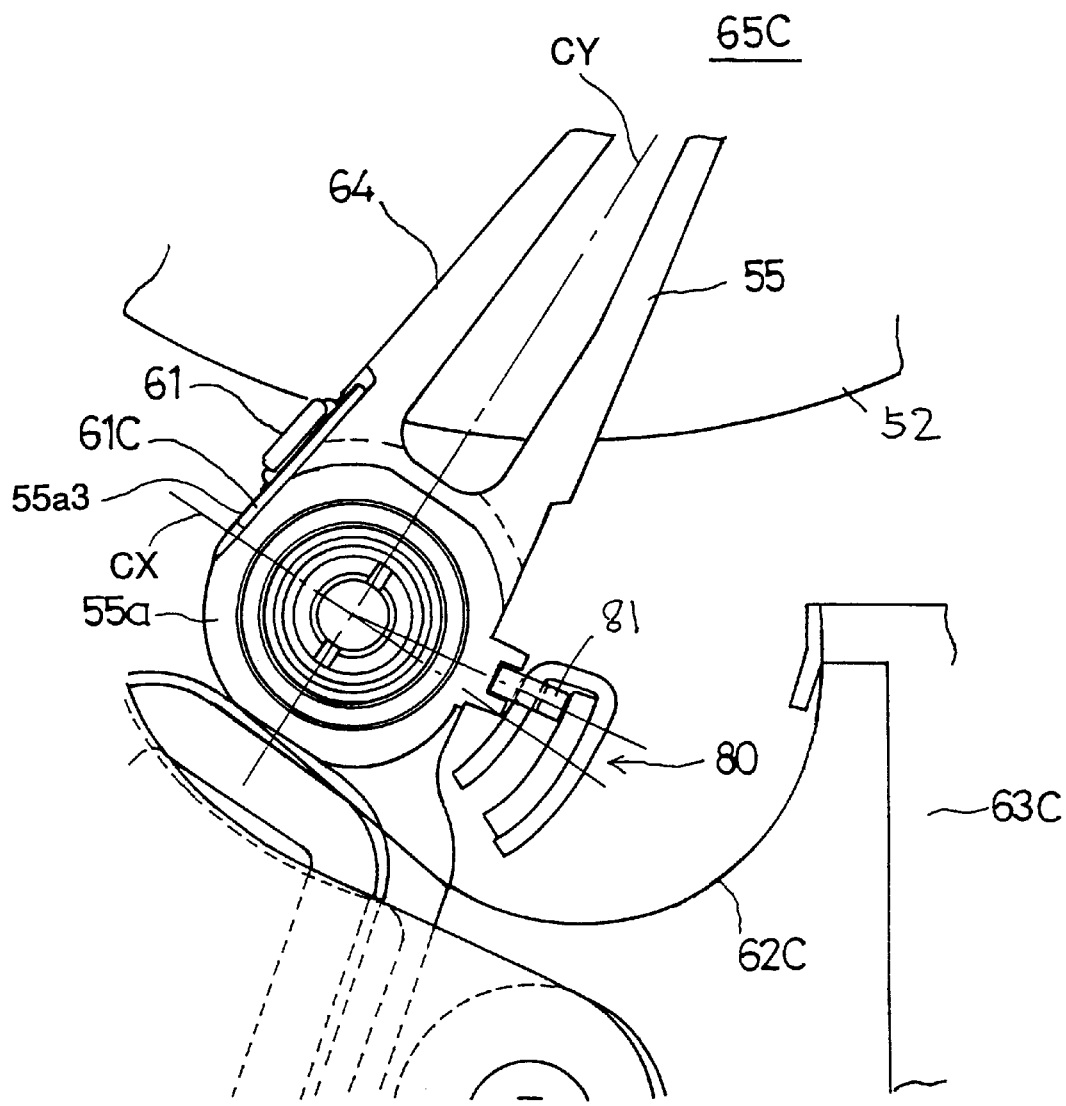
FIG. 16 illustrates a third modification of the wire route structure.

FIG. 16 illustrates a wire route structure 65C of a third modification. A support plate 60C is screwed to a side surface 55a3 on the X2-direction side of the hub portion 55a. The support plate 60C is disposed on the opposite side to the secondary magnetic driving unit 80 with respect to the axial line CY. A flexible cable 62C extends in the X1 direction from a point on the Y1-direction side of the hub portion 55a, and then crosses the head carriage 55. The flexible cable 62C further extends in the X1 direction from a point on the Y2-direction side of the secondary magnetic driving unit 80, and then gently curves in the Y1 direction. Here, the end of the flexible cable 62C is connected to a circuit substrate 63C.

In the above embodiments and modifications, the magnetic head slider may be replaced with an optical head slider which integrally comprises an optical head and a slider. Accordingly, the present invention is applicable to an optical head slider suspension, an optical head slider supporting device, or an optical disk drive.

Although the present invention has been fully described by way of embodiments with reference to the accompanying drawings, it is to be noted that various changes and modifications will be apparent to those skilled in the art. Therefore, unless otherwise such changes and modifications depart from the scope of the present invention, they should be construed as being included therein.

The present application is based on Japanese priority application No. 11-68999, filed on Mar. 15, 1999, the entire contents of which are hereby incorporated by reference.

What is claimed is:

1. A head carriage assembly comprising:
   head carriage which has a hub portion rotatably supported about a rotational center shaft on a base, and rotatably moves a head in a radial direction of a rotating disk;
   first driving unit which generates a force to rotate the head carriage; and
   second driving unit which generates a force to rotate the head carriage, the second driving unit being located at a position along a line extending from a rotational center of the head carriage and substantially perpendicular to a line connecting the rotational center and the head,
   wherein the second driving unit comprises:
      a coil secured outside the hub portion of the head carriage, and has an axial line vertical to a surface which includes the rotational center shaft on the base; and
      a magnetic circuit body which comprises a yoke and a permanent magnet, with a magnetic gap being formed therebetween, and engages the coil to be secured to the base,
      a part of the coil moving within the magnetic gap.

2. The head carriage assembly according to claim 1, wherein:
   the magnetic circuit body comprises a U-shaped yoke having two facing yoke side plates and a permanent magnet secured to an inner surface of the yoke side plates of the yoke; and
   one of the yoke side plates penetrates through an opening in the center of the coil, and serves as an iron core of the coil.

3. The head carriage assembly according to claim 2, wherein
   the magnetic circuit body further comprises a return yoke which connects the two yoke side plates of the yoke.

4. A head carriage assembly comprising:
   a head carriage which has a hub portion rotatably supported about a rotational center shaft on a base, and rotatably moves a head in a radial direction of a rotating disk;
   a first driving unit which generates a force to rotate the head carriage; and
   a second driving unit which generates a force to rotate the head carriage, the second driving unit being located at a position along a line extending from a rotational center of the head carriage and substantially perpendicular to a line connecting the rotational center and the head,
   wherein the second driving unit comprises:
   a magnetic circuit body which comprises a yoke and a permanent magnet, with a magnetic gap being formed therebetween, and is disposed outside the hub portion of the head carriage; and
      a coil which engages the magnetic circuit body to be secured to the base, and has an axial line perpendicular to a surface including the rotational center shaft on the base,
      the magnetic circuit body moving so that part of the coil moves relatively within the magnetic gap.

5. The head carriage assembly according to claim 4, wherein:
   the magnetic circuit body comprises a U-shaped yoke having two facing yoke side plates and a permanent magnet secured on an inner surface of the yoke side plates of the yoke; and
   one of the yoke side plates of the yoke penetrates through an opening in the center of the coil, and serves as an iron core of the coil.

6. The head carriage assembly according to claim 5, wherein
   the magnetic circuit body further comprises a return yoke which connects the two yoke side plates of the yoke.

7. The head carriage assembly according to claim 4, wherein:
   the hub portion of the head carriage is made of a magnetic material;
   the magnetic circuit body comprises an L-shaped yoke which is integrally formed with the hub portion and protrudes outward from the hub portion; and
   the yoke penetrates through an opening in the center of the coil, and serves as an iron core of the coil.

8. A disk drive comprising:
   a head; and
   a head carriage assembly which includes a head carriage, a first driving unit, and a second driving unit,
   said head carriage having a hub portion rotatably supported about a rotational center shaft on a base, and rotationally moving said head in a radial direction of a rotating disk,
   said first driving unit generating a force to rotate the head carriage, said second driving unit generating a force to rotate the head carriage, the second driving unit being located at a position along a line extending from a rotational center of the head carriage and substantially perpendicular to a line connecting the rotational center and the head,
   wherein the second driving unit comprises:
      a coil secured outside the hub portion of the head carriage, and has an axial line vertical to a surface which includes the rotational center shaft on the base; and
      a magnetic circuit body which comprises a yoke and a permanent magnet, with a magnetic gap being formed therebetween, and engages the coil to be secured to the base,
      a part of the coil moving within the magnetic gap.

9. A disk drive comprising:
   a head; and
   a head carriage assembly which includes a head carriage, a first driving unit, and a second driving unit,
   said head carriage having a hub portion rotatably supported about a rotational center shaft on a base, and rotationally moving said head in a radial direction of a rotating disk,
   said first driving unit generating a force to rotate the head carriage,
   said second driving unit generating a force to rotate the head carriage, the second driving unit being located at a position along a line extending from a rotational center of the head carriage and substantially perpendicular to a line connecting the rotational center and the head,
   wherein the second driving unit comprises:
      a magnetic circuit body which comprises a yoke and a permanent magnet, with a magnetic gap being formed therebetween, and is disposed outside the hub portion of the head carriage; and
      a coil which engages the magnetic circuit body to be secured to the base, and has an axial line perpendicular to a surface including the rotational center shaft on the base,
      the magnetic circuit body moving so that part of the coil moves relatively within the magnetic gap.

* * * * *